A. McKenzie.
Square and Bevel.
Nº 17,106.                    Patented Apr. 21, 1857.
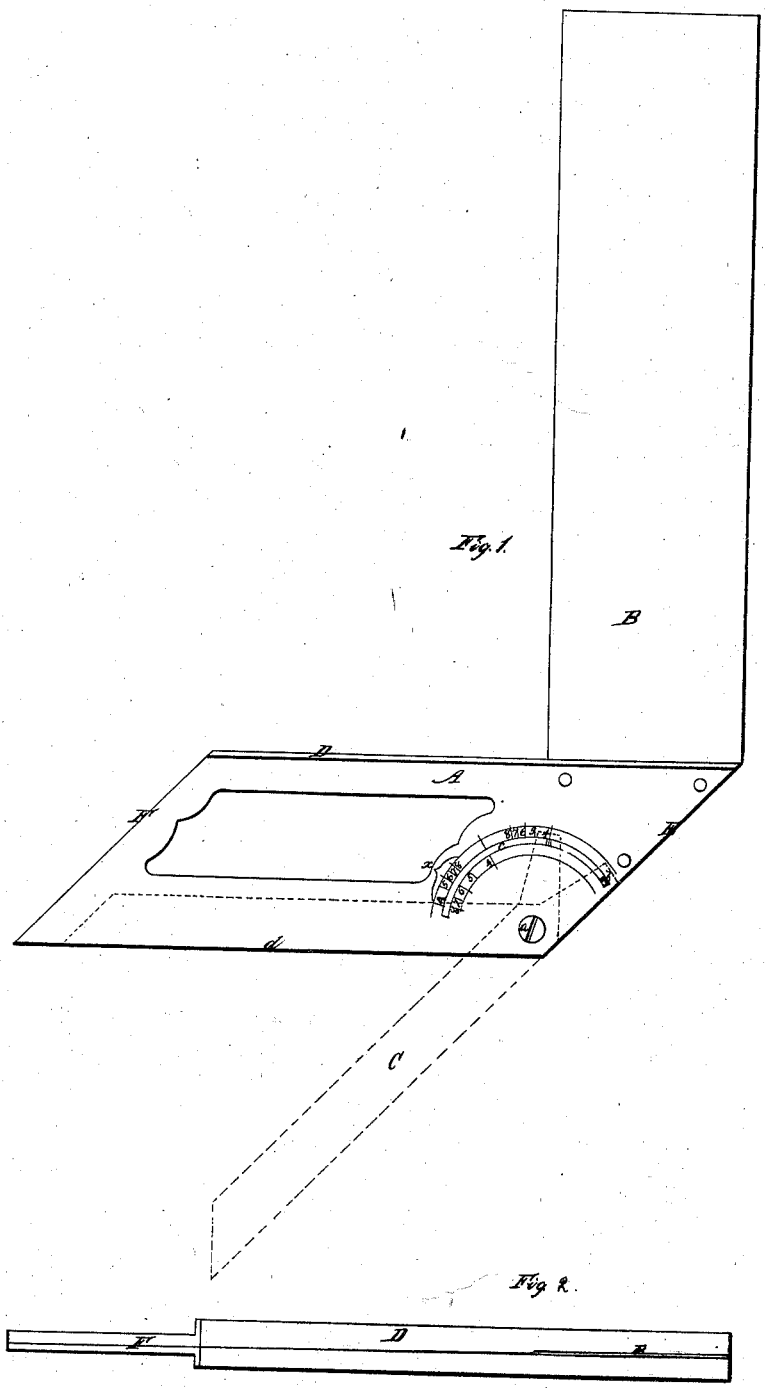

UNITED STATES PATENT OFFICE.

A. McKENZIE, OF BOSTON, MASSACHUSETTS.

COMBINED SQUARE, MITER-SQUARE, AND BEVEL.

Specification of Letters Patent No. 17,106, dated April 21, 1857.

*To all whom it may concern:*

Be it known that I, A. McKenzie, of Boston, in the county of Suffolk and State of Massachusetts, have invented a new and Improved Square, Miter-Square, and Bevel Combined, of which the following is a full, clear, and exact description, reference being had to the accompanying drawings.

Carpenters and other artisans find it a great convenience to have their tools and instruments used for measuring, so combined that the same instrument may be used for the measurement of various forms. This advantage I have obtainel in a peculiar degree by the combination of the square, miter square and bevel which I have invented, giving to the artisan a perfect tool for each purpose and yet so combining them in one instrument that he may have them ready to his hand for each and all the purposes to which they may be applicable.

To enable others skilled in the art to understand and use my invention, I will proceed to describe the manner in which I have carried it out.

In the accompanying drawings Figure 1 is a plan of my improved square. Fig. 2, a view of the same showing the raised edge or guard in the stock of the square.

A, is the stock of the square, B, the steel arm projecting from it in the ordinary manner. C, is a smaller arm pivoted to the stock at $a$, which when not in use, is closed up and shuts into a slit in the back of the stock as seen dotted in black in Fig. 1. To the inner end of this arm which traverses within the stock, is attached a pointer or stop $b$, which moves in the circular slot $c$, on the sides of which are marked scales to the figures on which the pointer $b$ may be adjusted, causing the arm $c$, to form with the back of the stock at $d$, any required angle. The stock A, is made thicker on its inner or face edge as at D, Figs. 1 and 2.

The above described improved tool may be used, 1st as a common square, the edge D and arm B being at right angles to each other. 2nd as a miter square for a square miter, the raised edge at D, forming with the ends of the stock at E, and F, angles of 45 degrees. The line of the angle E, may be further extended by placing the arm C, in the position shown in red in Fig. 1, the pointer $b$, being opposite to the figure 4, on the scale on the outside of the circular slot $c$. 3rd as a miter bevel for the angle of the miter of any other figure such as a pentagon, octagon, &c., by moving the arm C, until the pointer $b$, is opposite the figure 5 or 8, &c., when it will form the required angle with the back of the stock at $d$. 4th by moving the pointer $b$, opposite a figure on the scale on the inside of the circular slot $c$., the arm C, and edge $d$, may be placed at the required angle to form the sides of a piece of timber of an octagon, pentagon, or other form. 5th the arm C, may be used as a common bevel from the back of the stock at $d$.

The figures (marked $x$,) on the outside of the slot near the end of the scale, may be used in the same manner as those first spoken of, by throwing the arm C, still farther around and working from the back of the stock at $d$, the angle thus formed being the supplement of the former or the measure of the miter angle, taken from the inside of the box or other article, while the former was from the outside.

The arm C, may be secured in any required position by tightening the screw at $a$.

What I claim as my invention and desire to secure by Letters Patent is—

The within described arrangement of the try square, the miter and the bevel blade, the latter being hung so as to project upon the opposite side of the stock from the blade and so as to form, when set at an angle of 45°, a continuation of the miter bevel as set forth.

ALEX McKENZIE.

Witnesses:
Thos. R. Roach,
P. E. Teschemacher.